(12) United States Patent
Gozzini

(10) Patent No.: US 6,665,428 B1
(45) Date of Patent: Dec. 16, 2003

(54) RESISTIVE FINGER DETECTION FOR FINGERPRINT SENSOR

(75) Inventor: Giovanni Gozzini, Berkeley, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 615 days.

(21) Appl. No.: 09/649,808

(22) Filed: Aug. 28, 2000

(51) Int. Cl.⁷ .................................................. G06K 9/00
(52) U.S. Cl. ...................................................... 382/124
(58) Field of Search ................................. 382/115, 116, 382/124, 125, 126; 324/681, 662, 672; 340/5.82, 5.83, 5.53

(56) References Cited

U.S. PATENT DOCUMENTS

| | | | | |
|---|---|---|---|---|
| 5,325,442 A | * | 6/1994 | Knapp | 382/124 |
| 5,990,804 A | * | 11/1999 | Koyama | 340/5.82 |
| 6,181,808 B1 | * | 1/2001 | Fukuzumi | 382/126 |
| 6,259,804 B1 | * | 7/2001 | Setlak et al. | 382/124 |
| 6,501,284 B1 | * | 12/2002 | Gozzini | 324/681 |

* cited by examiner

*Primary Examiner*—Samir Ahmed
*Assistant Examiner*—Vikkram Bali
(74) *Attorney, Agent, or Firm*—Lisa K. Jorgenson; William A. Munck

(57) ABSTRACT

Within a capacitive fingerprint detection device, finger detection is provided by a plurality of resistive grids overlying the fingerprint sensor electrodes to measure the resistance of the finger placed on the sensor surface. A finger placed on the sensor surface connects the resistive rids and allows the skin resistivity to be measured. The measured resistance is compared to a reference resistance or range of resistances to determine whether the measured resistance matches the expected bio-characteristics of living skin tissue. The finger detection thus provides anti-spoofing protection for the fingerprint detection device.

20 Claims, 3 Drawing Sheets

RESISTIVE FINGER DETECTION FOR FINGERPRINT SENSOR

RELATED APPLICATIONS

The present invention is related to the subject matter of commonly assigned, U.S. patent application Ser. No. 09/648,968 entitled "CAPACITIVE FINGER DETECTION FOR FINGERPRINT SENSOR" and filed Aug. 28, 2000. The content of the above-referenced application is incorporated herein by reference.

BACKGROUND OF THE INVENTION

1. Field of the Invention

The present invention relates to fingerprint detection and recognition and in particular to finger detection within integrated circuit devices employed for fingerprint-based identification and security mechanisms.

2. Description of the Prior Art

Fingerprint detection and recognition has become a widely implemented identification and security (verification) measure for a variety of applications, including credit card usage, governmental licensing and registration, and premises access control. Integrated circuit fingerprint sensors used in such detection usually contain a two-dimensional array of sensing electrodes at a pitch substantially smaller than the size of the lines on the skin surface of a fingertip, allowing an image of the fingerprint pattern to be acquired for processing, analysis and comparison.

The structure of a typical electronic fingerprint sensor is depicted in FIG. 4. Fingerprint sensor 402 includes a planar array of sensing electrodes 404 conductively coupled to detection and image capture circuitry (not shown). Sensing electrodes 404 may be covered by a protective layer 406 against which the skin surface 408 of the fingertip is placed. Ridges 410 and valleys 412 formed by the lines on the fingertip skin surface 408 are then detected utilizing sensing electrodes 404.

Fingerprint detection is most commonly achieved at least partially through capacitive coupling with the finger. In such embodiments, skin surface 408 and sensing electrodes 404 each form a capacitor having a capacitance proportional to the distance between a respective sensing electrode 404 and the overlying skin surface 408. Thus, for example, the capacitance measured by sensor 402 at a point near the top of a fingerprint ridge 410 by a sensing electrode separated from skin surface 408 by a distance $d_{x,y}$ (where x and y denote the position of the respective sensing electrode within the two-dimensional sensor array) will differ from the capacitance measured through another sensing electrode at a point near the bottom of a fingerprint valley 412, where the intervening distance $d_{x,y+2}$ is greater. In this manner an electronic image of the fingerprint may be captured for further processing.

Fingerprint detection normally involves a relative or comparative process, in which a characteristic such as capacitance) at one sensing electrode within the array is processed relative to similar measurements by the other sensing electrodes. As a result, the fingerprint sensor is subject to attack by "spoofing," or presentation of the appropriate fingerprint pattern by an unauthorized individual. For example, the simplest spoofing technique might involve use of a finger severed from an authorized individual for that purpose.

It would be desirable, therefore, to protect against unauthorized uses of fingerprint patterns being employed in order to circumvent fingerprint-based identification and security mechanisms.

SUMMARY OF THE INVENTION

Within a capacitive fingerprint detection device, finger detection is provided by a plurality of resistive grids overlying the fingerprint sensor electrodes to measure the resistance of the finger placed on the sensor surface. A finger placed on the sensor surface connects the resistive rids and allows the skin resistivity to be measured. The measured resistance is compared to a reference resistance or range of resistances to determine whether the measured resistance matches the expected bio-characteristics of living skin tissue. The finger detection thus provides anti-spoofing protection for the fingerprint detection device.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

The following description details the structure, application and features of the present invention, but it will be understood by those of skill in the art that the scope of the invention is defined only by the issued claims, and not by any description herein. The process steps and structures described below do not form a complete process flow for manufacturing integrated circuits. The present invention can be practiced in conjunction with integrated circuit fabrication techniques currently used in the art, and only so much of the commonly practiced process steps are included as are necessary for an understanding of the present invention. The figures representing cross-sections of portions of an integrated circuit during fabrication are not drawn to scale, but instead are drawn so as to illustrate the important features of the invention.

Figure 1:
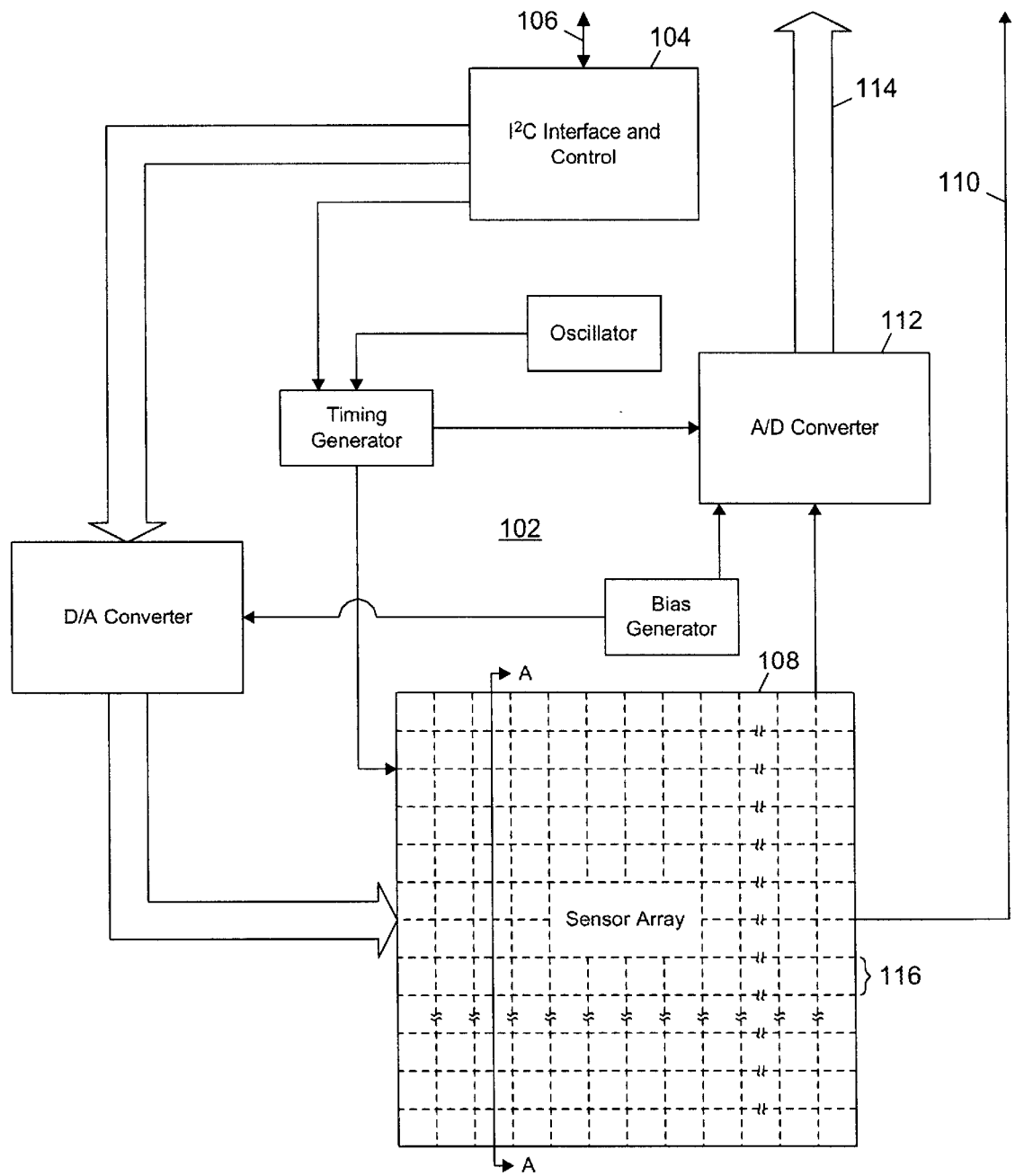
FIG. 1 depicts a fingerprint sensor circuit employing resistive finger detection in accordance with a preferred embodiment of the present invention.

With reference now to the figures, and in particular with reference to FIG. 1, a fingerprint sensor circuit employing resistive finger detection in accordance with a preferred embodiment of the present invention is depicted. FIG. 1 depicts a block diagram of the sensor circuit 102, which is formed as an integrated circuit on a single die. A suitable sensor circuit 102 and its operation are described more fully in commonly assigned, application Ser. No. 09/040,261, entitled "CAPACITIVE DISTANCE SENSOR" and filed May 9, 1998, which is incorporated herein by reference.

Sensor circuit 102 includes I²C interface and control device 104, which provides a bidirectional communication protocol enabling sensor circuit 102 to communicate with a controller, such as a microcontroller. I²C interface and control device 104 exchanges digital signals via control line 106 with controller circuitry (not shown) external to sensor circuit 102 in the example illustrated, although alternatively such control circuitry may also be integrated within sensor circuit 102. Sensor circuit 102 also includes an array 108 of capacitive sensors for fingerprint acquisition by sensing distances between capacitive electrodes within the sensor array 108 and ridges and grooves on a finger placed in contact with sensor array 108.

Sensor array 108 is coupled to the external controller circuit via synchronization line 110. Through synchronization line 110 sensor array 108 provides synchronization signals allowing detected voltages representative of the capacitive value of individual capacitive electrodes within sensor array 108, and therefore representative of the distance between the capacitive electrode and the portion of the epidermal layer contacting sensor array 108 in the region of the capacitive electrode, to be properly interpreted by the external controller. Sensor circuit 102 also includes an analog-to-digital (A/D) converter 112 processing analog voltage measurements received from sensor array 108 and generating digital representations recognized by the external controller as distance measurements of the analog measured voltages from individual capacitive electrodes within sensor array 108. A/D converter 112 transmits these digital signals to the external controller on output bus 114.

Sensor array 108 includes a plurality of cells 116 each containing one or more capacitive electrodes. Sensor array 108 in the exemplary embodiment contains square cells approximately 45–50 μm on a side, forming a 250×350 array of contiguous cells 116 within sensor array 108. Sensor array 108 is covered by a passivation material overlying the capacitive electrodes within each cell 118. Other active devices required to form sensor circuit 102 are formed below the capacitive electrodes.

Figure 2A:
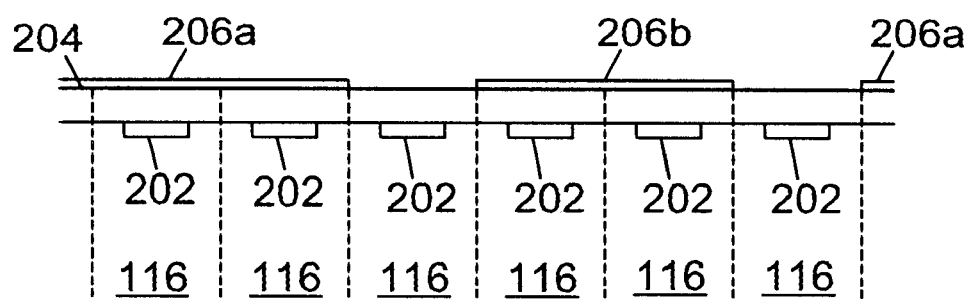
FIGS. 2A–2B are diagrams of fingerprint sensor arrays including resistive finger detection in accordance with a preferred embodiment of the present invention.
Figure 2B:
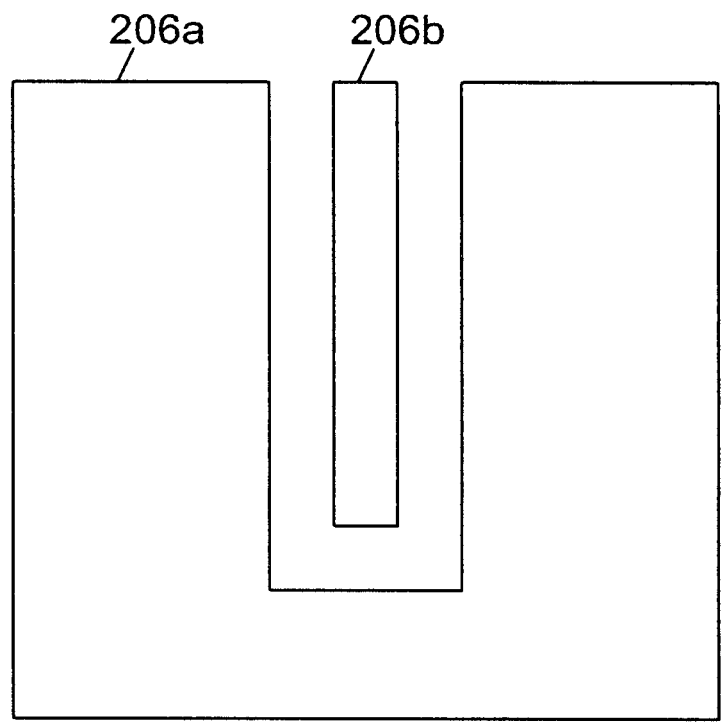

Referring to FIGS. 2A and 2B, diagrams of sensor arrays including resistive finger detection in accordance with a preferred embodiment of the present invention are illustrated. The cross-section depicted in FIG. 2A is a cross-section of sensor array 108 taken at section line A—A depicted in FIG.1. Cells 116 within sensor array 108 each include at least one capacitive fingerprint sensor electrode 202, which is employed to detect the fingerprint in accordance with the known art. A protective layer 204, which may be a combination of insulating and passivating layers, overlies the fingerprint sensor electrodes 202 and provides a surface on which the finger is placed.

In the present invention, sensor array 108 also includes a plurality of resistive grids 206a–206b employed to sense the resistance of the finger when placed on the surface of the sensor array 108. This sensed resistance is then compared to a predefined "sample" or threshold value or range. If the resistance of the finger is greater than the predefined value (or within the range), a finger is detected on the surface of sensor array 108.

Resistive finger detection grids 206a–206b are formed over the fingerprint sensor detection electrodes 202, on the surface of fingerprint detection device 102 on which the finger is to be placed. Relative capacitive measurements between fingerprint sensor detection electrodes 202 will not be skewed by the presence of resistive grids 206a–202b. Resistive sensing grids 206a–206b are isolated from each other, but may come in contact with a finger touching the surface of fingerprint detection device 102. When the finger is on the sensing surface of the fingerprint detection device 102, the skin resistivity of the finger provides a resistive path from one grid 206a to the other 206b. Measuring the resistance between the two grids provides a means for measuring the skin resistivity of the finger. A plan view of a suitable geometry for grids 206a–206b is illustrated in FIG. 2B.

Figure 3:
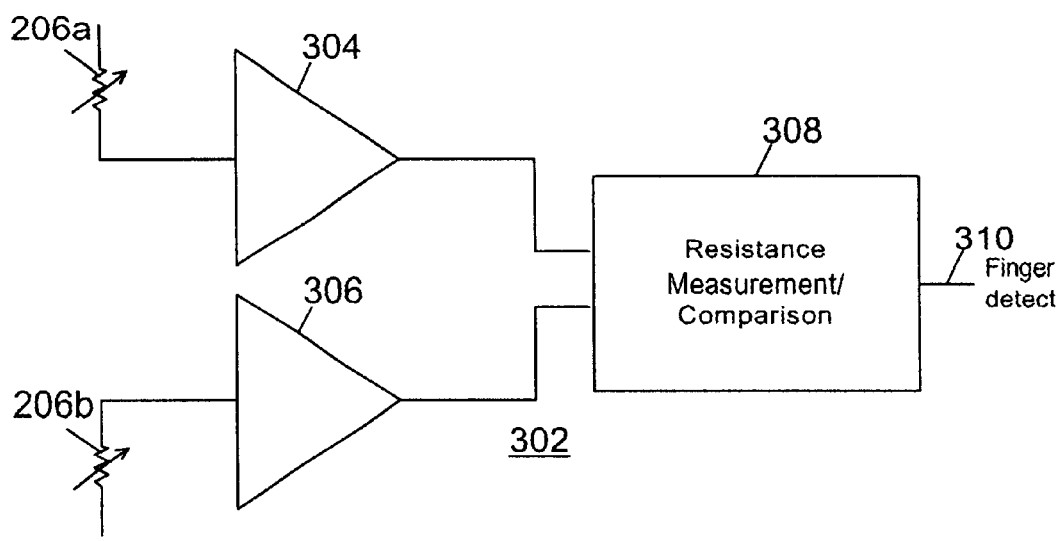
FIG. 3 depicts a circuit diagram for a finger detection circuit employed within a fingerprint sensor in accordance with a preferred embodiment of the present invention.
Figure 4:
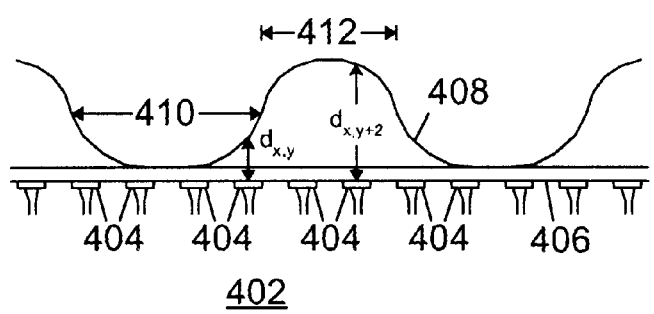
FIG. 4 is a diagram of a known capacitive fingerprint detection structure.

With reference now to FIG. 3, a circuit diagram for a finger detection circuit employed within a fingerprint sensor in accordance with a preferred embodiment of the present invention is depicted. Within finger detection circuit 302, resistive grids 206a–206d are coupled to a resistance measurement and comparison unit 308. As noted above, the resistance of a finger placed on the sensor device 102 is measured and utilized to detect a finger. This resistance will depend on the bio-characteristics of the skin on the finger, which is employed to prevent spoofing by determining whether the finger placed on the fingerprint sensor device 102 provides a resistance within a predefined range or above a predefined value.

The resistance measurement is accomplished by connecting the variable resistances representing the finger connecting resistive grids 206a–206b, through amplifiers 304 and 306, to a resistance measurement and comparison unit 308, which compares the resistance between grids 206a–206b to a reference resistance or a range of resistances. The difference in resistances is determined by the comparator portion of resistance measurement and comparison unit 308, which generates an output signal 310 indicated whether a finger has been detected.

Depending upon the processing and memory capabilities available, the measured resistance may be compared to absolute thresholds or ranges for the entire populace, or to specific ranges for particular individuals identified by their fingerprint, with the individual ranges of authorized individuals being dynamically updated over time to accommodate aging and seasonal variations in the relevant bio-characteristics. In addition to providing anti-spoofing protection, fingerprint acquisition by the fingerprint sensor may also be concurrently triggered by the finger detection mechanism of the present invention.

The present invention employs measurement of bio-characteristics of skin, specifically resistance of a finger placed on a sensor for fingerprint detection, to provide anti-spoofing protection and real finger detection. Other bio-characteristics of living skin tissue may also be employed in conjunction with the present invention. The resistive finger detection mechanism may be combined with the capacitive finger detection mechanism described in the related application, either utilizing separate capacitive and resistive grids or utilizing a single grid for both capacitive and resistive measurements.

While the invention has been particularly shown and described with reference to a preferred embodiment, it will be understood by those skilled in the art that various changes in form and detail may be made therein without departing from the spirit and scope of the invention.

What is claimed is:

1. A method of finger detection, comprising:
measuring a resistance between at least two isolated resistive grids on a sensing surface of a capacitive fingerprint detection device when connected by an object placed on the sensing surface of the fingerprint detection device, wherein the capacitive fingerprint detection device includes a plurality of capacitive sensor electrodes below the resistive grids for detecting fingerprint features;
comparing the measured resistance to a resistance range corresponding to living skin tissue to determine whether a finger has been placed on the surface of the fingerprint detection device.

2. The method of claim 1, further comprising:

responsive to determining that the measured resistance falls within the resistance range corresponding to living skin tissue, indicating that a finger has been placed on the surface of the fingerprint detection device.

3. The method of claim 2, wherein the step of measuring a resistance between at least two isolated resistive grids on a sensing surface of a capacitive fingerprint detection device when connected by an object placed on the sensing surface of the fingerprint detection device further comprises:

measuring a resistance between two resistive grids connected by the object.

4. The method of claim 3, further comprising:

measuring a resistance between two resistive grids electrically connected by a finger; and responsive to determining that the measured resistance between the two resistive grids falls within the resistance range corresponding to living skin tissue, indicating that the object on the surface of the fingerprint detection device is the finger.

5. The method of claim 3, further comprising:

measuring a resistance between two resistive grids electrically connected by an object other than a finger; and responsive to determining that the measured resistance between the two resistive grids falls outside the resistance range corresponding to living skin tissue, indicating that the object on the surface of the fingerprint detection device is not a finger.

6. The method of claim 2, further comprising:

comparing the measured resistance to a threshold resistance;

responsive to determining that the measured resistance is greater than the threshold resistance, indicating that a finger has been placed on the surface of the fingerprint detection device; and responsive to determining that the measured resistance is not greater than the threshold resistance, indicating that an object other than a finger has been placed on the surface of the fingerprint detection device.

7. Anti-spoofing protection for a fingerprint detection device, comprising:

a plurality of resistive grids overlying capacitive sensor electrodes employed within the fingerprint detection device to detect fingerprint features on a sensing surface of the fingerprint detection device;

resistance measurement means measuring a resistance between two of the resistive grids when an object on the sensing surface electrically connects the two resistive grids; and comparator means comparing the measured resistance to resistive bio-characteristics of living skin tissue to determine whether the object on the sensing surface of the fingerprint detection device is a finger.

8. The anti-spoofing protection of claim 7, wherein the plurality of resistive grids further comprises:

the two resistive grids.

9. The anti-spoofing protection of claim 7, wherein the plurality of resistive grids further comprises:

two resistive grids having interlocking regions adapted to be overlapped and electrically connected by an object on the sensing surface.

10. The anti-spoofing protection of claim 7, wherein the comparator means further comprises:

means for indicating whether the object on the sensing surface of the fingerprint detection device is a finger.

11. The anti-spoofing protection of claim 7, wherein the comparator means indicates that the object on the sensing surface of the fingerprint detection device is a finger if the measured resistance falls within a predefined range of resistances.

12. The anti-spoofing protection of claim 7, wherein the comparator means indicates that the object on the sensing surface of the fingerprint detection device is not a finger if the measured resistance falls outside a predefined range of resistances.

13. The anti-spoofing protection of claim 7, wherein the comparator means compares the measured resistance to a threshold resistance.

14. A fingerprint detection device, comprising:

capacitive sensor electrodes employed to detect fingerprint features;

a plurality of resistive grids on a sensing surface of the fingerprint detection device and overlying the capacitive sensor electrodes;

resistance measurement means measuring a resistance between two of the resistive grids when an object on the sensing surface electrically connects the two resistive grids; and comparator means comparing the measured resistance to resistive bio-characteristics of living skin tissue to determine whether the object on the sensing surface of the fingerprint detection device is a finger.

15. The fingerprint detection device of claim 14, wherein the plurality of resistive grids further comprises:

the two resistive grids.

16. The fingerprint detection device of claim 14, wherein the plurality of resistive grids further comprises:

two resistive grids having interlocking regions adapted to be overlapped and electrically connected by an object on the sensing surface.

17. The fingerprint detection device of claim 14, wherein the comparator means further comprises:

means for indicating whether the object on the sensing surface of the fingerprint detection device is a finger.

18. The fingerprint detection device of claim 14, wherein the comparator means indicates that the object on the sensing surface of the fingerprint detection device is a finger if the measured resistance falls within a predefined range of resistances.

19. The fingerprint detection device of claim 14, wherein the comparator means indicates that the object on the sensing surface of the fingerprint detection device is not a finger if the measured resistance falls outside a predefined range of resistances.

20. The fingerprint detection device of claim 14, wherein the comparator means compares the measured resistance to a threshold resistance.

* * * * *